United States Patent [19]

Kawashima et al.

[11] Patent Number: 4,950,209
[45] Date of Patent: Aug. 21, 1990

[54] AUTOTENSIONER

[75] Inventors: Kazuki Kawashima; Hisashi Hayakawa, both of Iwata, Japan

[73] Assignee: NTN Toyo Bearing Co., Ltd., Osaka, Japan

[21] Appl. No.: 394,032

[22] Filed: Aug. 15, 1989

[30] Foreign Application Priority Data

Oct. 18, 1988 [JP] Japan ............................ 63-135603[U]

[51] Int. Cl.$^5$ ............................................. F16H 7/12
[52] U.S. Cl. ..................................... 474/138; 474/110
[58] Field of Search ......................... 474/101, 109–111, 474/113–117, 133, 135, 136, 138

[56] References Cited

U.S. PATENT DOCUMENTS

| | | | |
|---|---|---|---|
| 4,539,001 | 9/1985 | Okabe | 474/138 |
| 4,657,524 | 4/1987 | Okabe | 474/110 |
| 4,708,696 | 11/1987 | Kimura et al. | 474/138 X |
| 4,790,796 | 12/1988 | Okabe et al. | 474/138 X |

FOREIGN PATENT DOCUMENTS 62-40355 3/1987 Japan .

*Primary Examiner*—Thuy M. Bui
*Attorney, Agent, or Firm*—Armstrong, Nikaido, Marmelstein, Kubovcik & Murray

[57] ABSTRACT

An autotensioner includes a cylinder having its bottom closed and filled with a hydraulic oil and air, an oil seal mounted in the cylinder to seal the hydraulic oil and air, a rod slidably extending through the oil seal, and a piston slidably mounted in the cylinder with its top end abutting the bottom of the rod. The interior of the cylinder is separated into an upper reservoir chamber and a lower pressure chamber by the piston. Both chambers communicate with each other through a channel formed in the piston. The rod is biased by a spring mounted in the reservoir chamber in such a direction as to protrude from the cylinder. A check valve is provided in the pressure chamber near the bottom of the piston to open the channel in the piston only when the pressure in the pressure chamber is lower than the pressure in the reservoir chamber. The cylinder may have an outer casing and an inner sleeve so that the piston can slide on the inner surface of the sleeve.

2 Claims, 2 Drawing Sheets

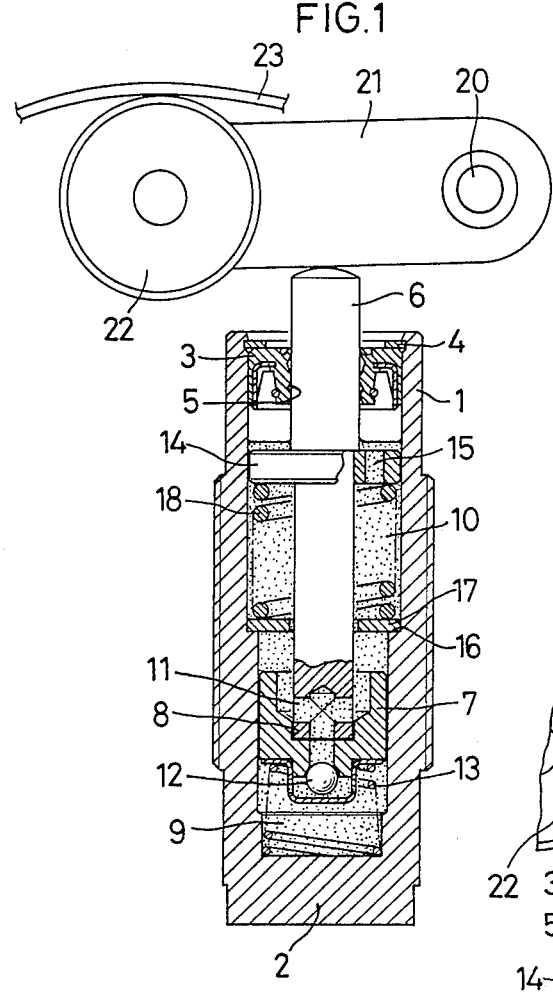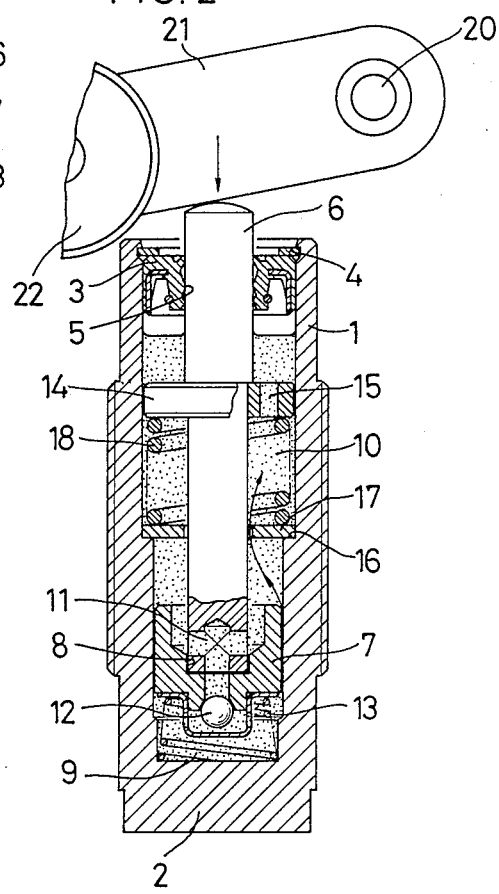

4,950,209

AUTOTENSIONER

BACKGROUND OF THE INVENTION

The present invention relates to an autotensioner for keeping the tension of a power transmission member such as a toothed belt or a chain to a predetermined level.

Since a power transmission member in the form of a belt mounted on an internal combustion engine is subject to change of tension with the fluctuation of the center-to-center distance between pulleys owing to a thermal expansion of the engine during operation or with the fluctuation of torque, it is a common practice to provide an autotensioner to apply tension to the belt through a tension roller and thus to keep constant the tension of the belt.

One such prior art autotensioner comprises a cylinder filled with a hydraulic oil, a piston slidably mounted in the cylinder and a pressure control spring for biasing a rod of the piston in such a direction as to protrude from the cylinder (Japanese Unexamined Utility Model Publication 62-40355).

With this type of prior art autotensioner, it is necessary to introduce hydraulic oil into the cylinder under vacuum so that it can replace the air in the cylinder. Thus it is extremely troublesome and time-consuming to assemble such an autotensioner.

Further it is necessary to seal the hydraulic oil in the cylinder by use of a diaphragm seal having a complicated configuration to absorb fluctuations in the amount of oil resulting from relative movements of the cylinder and the piston and fluctuations in the volume of oil owing to heat. Such a seal tends to be costly.

An autotensioner of an oil-sealed type can be theoretically oriented in any desired direction. For all practical purpose though, it is mounted in such a direction that its rod extends vertically in most cases in view of the layout of engine and the like. Thus, the advantage of the oil-sealed type is not fully utilized.

It is an object of the present invention to provide an autotensioner which obviates the abovesaid shortcomings and which is reliable and inexpensive.

SUMMARY OF THE INVENTION

In accordance with the present invention, there is provided an autotensioner comprising a cylinder having its bottom closed and filled with a hydraulic oil and air, an oil seal mounted in the cylinder to hermetically seal the hydraulic oil and air, a rod slidably extending through the oil seal, a piston slidably mounted in the cylinder so as to leave a small gap therebetween and having its top in abutment with the bottom of the rod, the interior of the cylinder being partitioned into a lower pressure chamber and an upper reservoir chamber by the piston, the piston being formed with a channel interconnecting the pressure chamber and the reservoir chamber, a check valve provided in the pressure chamber to open said channel in the piston only when the pressure in the pressure chamber is lower than the pressure in the reservoir chamber, and a spring mounted in the reservoir chamber to bias the rod in such a direction as to protrude from the cylinder.

According to the present invention, hydraulic oil is introduced into the cylinder before mounting the oil seal and the rod is axially reciprocated several times to allow part of the hydraulic oil to flow into the pressure chamber. This allows the assembly of the autotensioner under normal pressure.

BRIEF DESCRIPTION OF THE DRAWINGS

The features and objects of the present invention will become apparent from the accompanying drawings, in which FIG. 1 is a sectional view of the first embodiment of the present invention;

FIGS. 2 and 3 are sectional views of the same showing how it operates;

DESCRIPTION OF THE PREFERRED EMBODIMENTS

Figure 3:
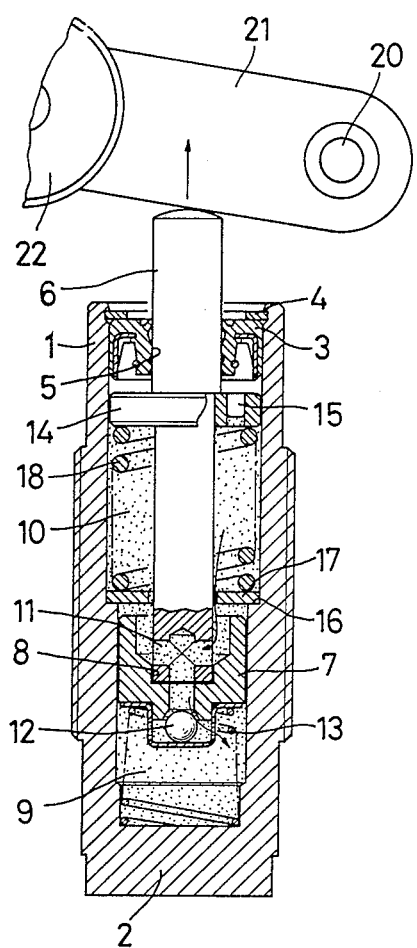
Figure 4:
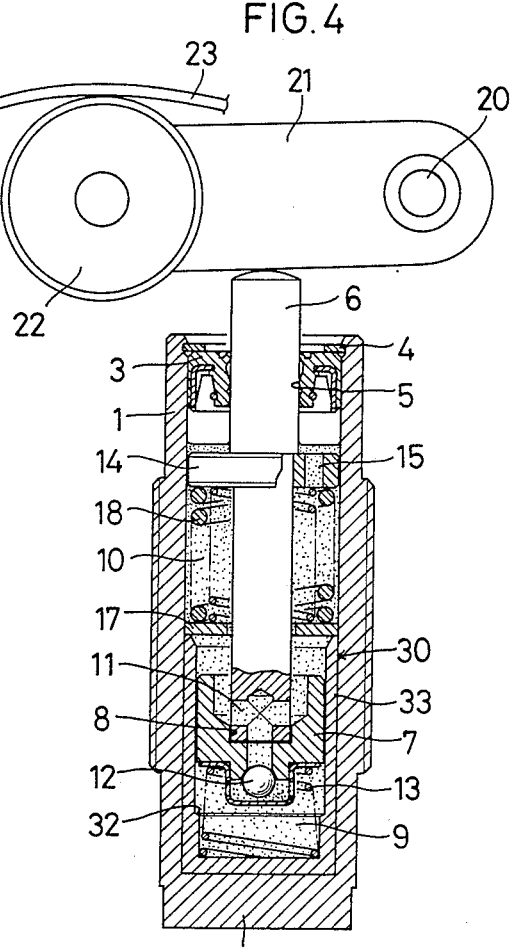
FIG. 4 is a sectional view of the second embodiment.

As shown in FIG. 1, the autotensioner in the first embodiment includes a cylinder 1 having a closed end 2. An oil seal 3 is fitted in the cylinder 1 near its top end and prevented from coming off the cylinder by means of a stopper ring 4. The oil seal 3 serves to prevent leakage of the hydraulic oil and the air in the cylinder. The hydraulic oil should preferably be silicone oil in view of its low variation of viscosity but may be an engine oil.

A rod 6 slidably extends through a hole 5 formed in the center of the oil seal 3 and has its bottom end received in a hole 8 formed in the top of a piston 7 slidably mounted in the cylinder 1.

A channel 11 extends through the rod 6 and the piston 7 so that a pressure chamber 9 and a reservoir chamber 10 defined immediately under and over the piston 7 will communicate with each other through the channel 11. A check valve 12 is provided at the bottom end of piston 7 to open the channel 11 when the pressure in the pressure chamber 9 sinks below the pressure in the reservoir chamber 10.

A spring 13 is mounted under the piston 7 to bias the piston 7 upwardly and hold it in engagement with the rod 6.

A bearing 14 is slidably mounted in the reservoir chamber 10 to support the rod 6 at its upper portion and thus to keep it in alignment with the cylinder 1. The bearing 14 is made of a porous sintered alloy and impregnated with hydraulic oil. Also it is formed with holes 15 for passing air and hydraulic oil.

A spring seat 17 is mounted between the bearing 14 and the piston 7 with its outer peripheral portion resting upon a shoulder portion 16 formed on the inner periphery of the cylinder 1. A gap is defined between the inner periphery of the spring seat 17 and the rod 6. The spring seat 17 serves to prevent the entry of air into the pressure chamber 9 owing to fluctuations of oil level resulting from change of mounting position of the autotensior or its vibration.

A pressure control spring 18 is mounted between the spring seat 17 and the bearing 14 to bias the rod 6 in such a direction as to protrude from the cylinder 1. It has a biasing force larger than that of the spring 13 mounted under the piston 7 so that it can receive most of the load on the rod 6.

The ratio of hydraulic oil to air sealed in the cylinder 1 has to be determined so that the air can absorb by changing its own volume any fluctuation of volume of the hydraulic oil resulting from fluctuation of internal volume of the cylinder owing to the axial movement of the rod 6 or from temperature fluctuation of hydraulic oil and that the air is prevented from getting into the pressure chamber 9 even if the mounting position of the autotensioner changes or the degree of vibration increases. The optimum ratio of air was found out by experiment to be (amount of air/amount of oil + amount of air) × 100 = 10−40 per cent.

The autotensioner according to the present invention is mounted with the end of the rod 6 protruding from the cylinder 1 upward. If the tension of a belt 23 is controlled by means of a tension roller 22 mounted on one end of a roller arm 21 having its other end pivotally mounted on a pin 20, the cylinder 1 is mounted on a suitable fixing member with the protruding end of the rod 6 in abutment with the underside of the roller arm 21.

If in this state the center-to-center distance between pulleys increases owing to a rise in temperature, thus increasing the tension of the belt 23 above a predetermined level, a downward force will be transmitted to the rod 6 through the roller arm 21 to push down the rod 6 as well as the piston 7, while compressing the pressure control spring 18. Thus the tension of the belt 23 will reduce gradually. On the other hand, hydraulic oil in the pressure chamber 9 is compressed by the descending piston 7 and gradually flows through a small gap formed between the inner periphery of the cylinder 1 and the outer periphery of piston 7 into the reservoir chamber 10, thus dampening the impulsive load acting on the belt 23.

When the belt 23 slackens, the rod 6 will move upwardly urged by the pressure control spring 18 to push up the roller arm 21 and thus to move the tension roller 22 in such a direction as to stretch the belt 23 taut. Thus the tension of the belt 23 is kept constant. Since the piston 7 rises together with the rod 6, the pressure in the pressure chamber 9 will fall below the pressure in the reservoir chamber 10, allowing the check valve 12 to move to a position to open the channel 11. The hydraulic oil in the reservoir chamber 10 will now begin to flow fairly smoothly into the pressure chamber 9 through the channel 11, allowing the rod 6 and piston 7 to move smoothly following the slackening of the belt 23.

In assembling the autotensioner, the spring 13, piston 7, spring seat 17, pressure control spring 18, bearing 14 and rod 6 are set in the cylinder 1 one after another. Before fitting the oil seal 3, the cylinder is filled with a predetermined amount of hydraulic oil and the rod 6 is axially reciprocated several times until the pressure chamber 9 is filled up with hydraulic oil. Thus the autotensioner according to the present invention can be assembled under atmospheric pressure.

Further, since hydraulic oil and air can be sealed in the cylinder by means of an ordinary oil seal instead of a diaphragm seal having a complicated configuration, the reliability of the entire device increases and the production cost decreases.

Air will not get into the pressure chamber because the autotensioner is mounted with its rod upward and the pressure chamber at the bottom. This will also lead to an improvement in reliability.

An oil seal allows incoming air to easily pass therethrough but not the passage of outgoing air. Thus the oil seal serves to keep the pressure in the reservoir chamber and the pressure chamber always higher than the atmospheric pressure. Just before the ball of the check valve comes off the plunger and the oil in the reservoir chamber begins to flow into the pressure chamber, the pressure chamber will be under negative pressure. But because the pressure in the entire cylinder is kept high, the pressure in the pressure chamber will be prevented from dropping so far below the atmospheric pressure as to cause cavitation.

The rod of the autotensioner is required to protrude quickly when the engine is started in a cold state. As the rod protrudes, the volume of the reservoir chamber reduces and the pressure increases, allowing smooth and rapid flow of oil into the pressure chamber. This means a good startability from a cold state. In contrast, with the prior art autotensioner with a diaphragm in the reservoir chamber (U.S. Pat. No. 4,708,696), when the rod is moving in the protruding direction, the pressure in the reservoir chamber will be prevented from rising owing to the action of the diaphragm seal, thus hampering a smooth and rapid flow of oil into the pressure chamber. This may result in a sharp drop in the pressure in the pressure chamber and cause cavitation especially in case the engine is started in a cold state. Because of the low pressure in the pressure chamber, the rod cannot rise quickly. This may cause the skipping of the belt.

Since the oil in the cylinder is positively prevented from leakage, there is no fear of the deterioration of belt resulting from oil adhesion.

Since the large-sized pressure control spring is provided in the reservoir chamber while the spring in the pressure chamber is much smaller in size, any air bubbles mixed into the pressure chamber can be driven out easily.

EMBODIMENT 2

Since the autotensioner in the second embodiment has substantially the same construction as the one in the first embodiment, like parts are represented by like numerals.

This embodiment differs from the first embodiment in that the cylinder 1 is made of an aluminum alloy, that a bottom-closed cylindrical sleeve 30 is disposed in the cylinder 1 at the bottom end thereof to define a chamber 31, and that a gap (not shown) is formed between the outer periphery of the piston 7 and the inner periphery of the sleeve 30.

In general, the sleeve 30 is made of steel or cast iron, whereas the piston 7 is made of steel or copper alloy but they may be made of any other material provided it has good leak down properties and good resistance to friction.

Between the cylinder 1 and the sleeve 30, a gap is defined which is adapted to remain present over the temperature range from approximately −30° C. to 120° C. This gap serves to prevent the inner diameter of the sleeve 30 from being influenced by the expansion and contraction of the inner diameter of the cylinder 1.

The spring seat 17 has its outer periphery supported on the top end of the sleeve 30. The sleeve is formed on its inner periphery at its lower part with a shoulder 32 protruding radially and inwardly to restrict the downward stroke of the piston 7. The coil spring 13 is received in a recess defined inside the shoulder 32 to abut the bottom of the sleeve 30.

Figure 5:
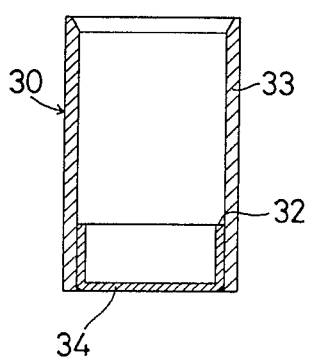
FIG. 5 is a sectional view of a modification of the sleeve of FIG. 4.
Figure 6:
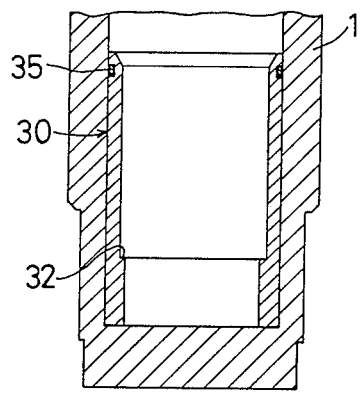
FIG. 6 is a sectional view of a further modification of the same.

FIG. 5 shows a modified sleeve 30 which comprises a cylindrical body 33 and a cap 34 press-fitted in the cylindrical body from its one end. The top edge of the cap 34 serves as the shoulder 32 for restricting the downward stroke of the piston.

The sleeve 30 do not necessarily have to be of the bottom-closed type as described above but may be in the form of a mere cylinder provided a seal member 35 is disposed between the cylinder 1 and the sleeve 30.

The second embodiment is substantially the same in operation as the first embodiment.

Though in the preferred embodiments the pressure control spring 18 is mounted in the cylinder 1, it may be mounted outside the cylinder e.g. between the arm 21 for the tension roller 22 and a fixed member.

The second embodiment will offer the following effects.

By the provision of sleeve between the cylinder and the piston, the cylinder can be made of aluminum alloy. This will make it possible not only to reduce its weight to a minimum but to make it by die casting.

The leak down characteristics are determined by the relationship between the materials for the piston and the sleeve, not between the materials for the piston and the cylinder. Thus the piston does not have to be made of an aluminum alloy but of any other desired material even though the cylinder is made of an aluminum alloy.

Machining of the frictional surface is easier with the sleeve than with the cylinder because the former is shallower than the latter.

By the provision of the gap between the sleeve and the cylinder, the leak down characteristics will not be influenced by change of inner diameter of the cylinder owing to temperature fluctuation during use.

What is claimed is:

1. An autotensioner comprising:
   a cylinder having its bottom closed and filled with hydraulic oil and air;
   an oil seal mounted in said cylinder to hermetically seal the hydraulic oil and air;
   a rod slidably extending through said oil seal;
   a piston slidably mounted in said cylinder so as to leave a small gap therebetween and having its top in abutment with the bottom of said rod, the interior of said cylinder being partitioned into a lower pressure chamber and an upper reservoir chamber by said piston, said piston being formed with a channel interconnecting said pressure chamber and said reservoir chamber;
   a check valve provided in said pressure chamber to open said channel in said piston only when the pressure in said pressure chamber is lower than the pressure in said reservoir chamber;
   a bearing slidably mounted in said reservoir chamber for supporting said rod; and
   a spring mounted in said reservoir chamber to bias said rod in such a direction as to protrude from said cylinder and through said bearing.

2. An autotensioner as claimed in claim 1, wherein said cylinder comprises: an outer casing and an inner sleeve mounted in said outer casing to cover at least part of the inner surface of said outer casing, said piston being adapted to slide on the inner surface of said inner sleeve, and said outer casing being made of an aluminum alloy.

* * * * *